Sept. 22, 1970　　　　　　　D. J. RUST　　　　　　3,530,275
CONDENSATION CONTROL FOR MIRRORS
Filed Oct. 31, 1968
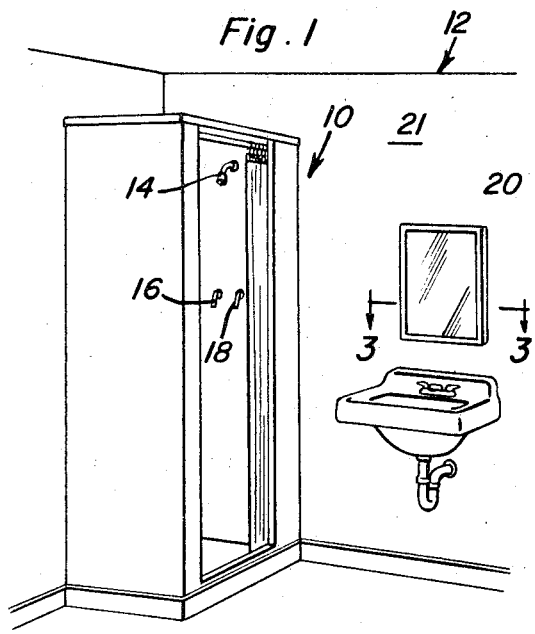
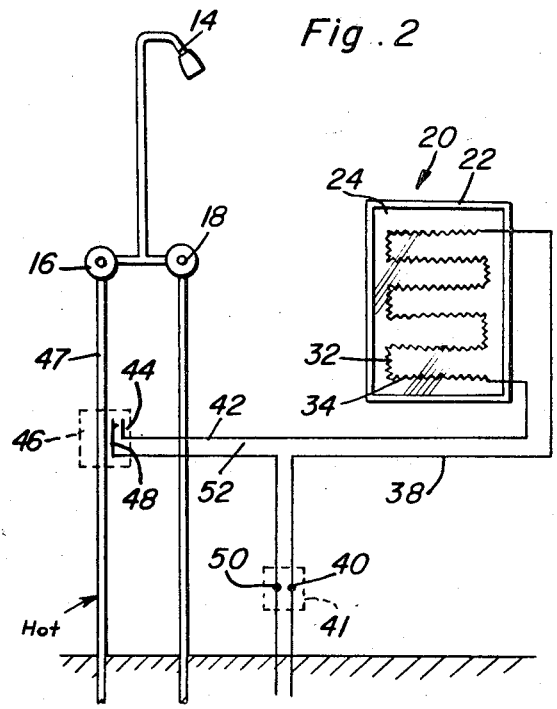
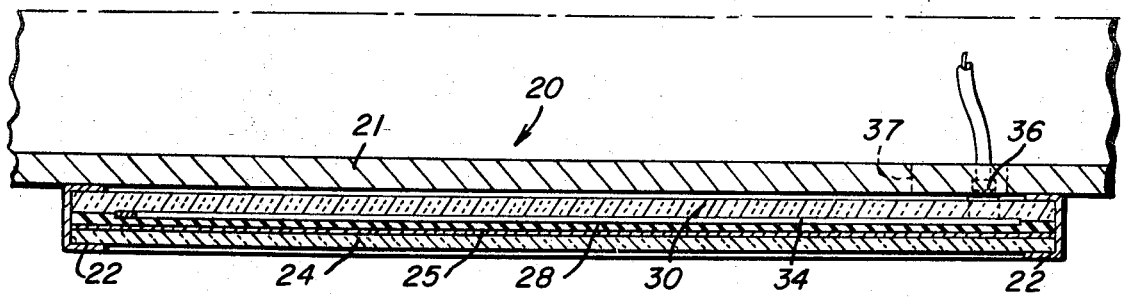
Duyane J. Rust
INVENTOR.

000
United States Patent Office 3,530,275
Patented Sept. 22, 1970

3,530,275
CONDENSATION CONTROL FOR MIRRORS
Duyane J. Rust, 109 N. Brown, Bryan, Tex. 77801
Filed Oct. 31, 1968, Ser. No. 772,094
Int. Cl. H05b 3/00
U.S. Cl. 219—219                                           1 Claim

ABSTRACT OF THE DISCLOSURE

A thermal sensitive switch is mounted on the hot water supply pipe of a shower. When heated water of a predetermined minimum temperature flows through the pipe, the switch is closed and causes energization of a heating element mounted behind a nearby mirror thereby causing the mirror glass to heat which prevents condensation from forming on the outward surface of the mirror.

---

The present invention relates to anti-fogging mirrors and more particularly to controls therefor.

In a bathroom having a mirror located near a shower, it is common for the mirror to fog when heated water is caused to flow from the shower. This is due to condensation of warm air upon the outward surface of the mirror. In the past, several attempts have been proposed for preventing condensation on a bathroom mirror. One approach includes a heating element disposed behind the mirror and when energized, heats the glass so as to raise the temperature of the outward mirror surface thereby preventing condensation thereupon. These prior art devices generally require manual energization of an electrical switch in order to permit electrical current to flow through the heating element. The requirement for manual control detracts from the automatic feature of an anti-fogging device because individuals may forget to turn the control switch on and off. Further, individuals using bathroom facilities for the first time may be unaware of the existence of the control switch.

The present invention includes the basic mirror and heating element assembly as propounded by the prior art. However, the improvement resides in the means for controlling energization of the heating element. In the present invention, a thermal sensing switch is mounted to the hot water supply pipe of a shower so that when the shower is turned on, heated water flowing to the shower head causes the switch to close at the initiation of a person's shower. Thus, the mirror situated in close proximity to the shower never has the opportunity to fog. Due to the nature of the thermal sensing switch, when the shower is turned off the supply pipe cools which causes the switch to open thereby terminating energization of the heating element. Thus, the heating element is automatically turned off as well as on without the manual assistance of the shower user.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a shower stall situated in close proximity to a mirror within the confines of a bathroom.

FIG. 2 is a schematic diagram illustrating the connection between the thermal sensing switch, as mounted upon the supply pipe of a shower, and the mirror heating element.

FIG. 3 is a transverse sectional view taken along a plane passing through section line 3—3 of FIG. 1 which exposes the interior component of the mirror and the disposition of the heating element therein.

Referring to FIG. 1, a shower stall generally denoted by reference numeral 10 is seen to be enclosed within the confines of a bathroom 12. The stall includes conventional shower 14 having hot and cold water controls 16 and 18 respectively. A mirror 20 is located near the shower stall as occurs in most conventional bathrooms. The mirror itself is connected to a wall 21 of the bathroom.

Referring to FIG. 3, there is shown the mirror assembly 20 including a rectangular open frame 22 which mounts the usual transparent glass plate 24. This plate is coated on the rear surface thereof with a light reflective coating 25 of silver, aluminum, or the like. The coating is itself coated with a non-electrically conducting film 28 made of plastic, or the like. An insulating board 30 fabricated from suitable material, such as plastic, fiberboard, asbestos, or the like is positioned adjacent the film 28. An electrical heating wire 34 is sinuously arranged between the non-electrical conductive film 28 and board 30 so that a generally uniform heat distribution is achieved. Opposite ends of the wire are connected to stand-off connectors 36 which insulate the heating wire ends from the mounting wall 21, upon which the mirror assembly 20 rests. Holes 37 are formed in wall 21 to permit passage of electrical leads from the heating wire ends through the wall to a suitable electrical terminal box as hereinafter discussed.

In FIG. 2, there is shown an electrical power lead 38 going to a first end of electrical heating element 34. The electrical lead 38 is connected at an opposite end thereof to a first terminal 40 of junction box 41. A second electrical power lead 42 is connected at one end thereof to the other heater wire end. The other end of power lead 42 is suitably connected to a first contact 44 of a conventional thermal sensing switch 46, which by way of example, may be of the bi-metallic type. The thermal sensing switch 26 in the particular embodiment illustrated, is mounted to the hot water supply pipe 47, thus being capable of detecting a preselected minimum temperature which causes the closing of contacts 44 and 48. However, the switch may be mounted in closer proximity to the head of shower 14 if need be. Of course, it will be appreciated, the predetermined minimum temperature required to close the switch contact in the latter instance would be lower than if the switch is mounted to the hot water supply pipe 47. This is due to the relatively cooler temperature of the water flowing through the shower head.

The second switch contact 48 is electrically connected to a second terminal 50 in junction box 41 by means of an electrical power lead 52. Thus, an electrical circuit between sensing switch 46 and the heater element 34 causes current to flow from the junction box 41 upon closing of the switch contacts 44 and 48 of switch 46.

The characteristics of the thermal sensing switching 46 must be such to allow closing of contacts 44 and 48 soon after the beginning of hot water flow through the hot water pipe 47. This permits the electrical heating of the mirror glass prior to the production of heated air within the confines of the bathroom and prevents condensation from forming on the outer surface of the mirror glass.

When a user terminates showering, the pipe upon which the thermal sensing switch 46 is mounted cools, which causes switch contacts 44 and 48 to open once again thereby terminating energization current from flowing through heater element 34. Thus completely automatic control of the heater element, from the beginning to the end of a shower cycle is effectuated.

The foregoing is considered as illustrative only of the principles of the invention. Further, since numerous modifications and changes will readily occur to those skilled in the art, it is not desired to limit the invention to the exact construction and operation shown and described,

What is claimed as new is as follows:

1. A control device connected to a shower for inhibiting condensation on a nearby mirror during use of the shower, the device comprising heater means adapted to be positioned in close proximity to the rearward surface of the mirror, switch means mounted to a hot water shower supply pipe for detecting a predetermined minimum temperature of water supplied to the shower, and means electrically connecting the switch means to the heater means for causing heating of the mirror when the switch means is closed thereby preventing condensation from forming on the mirror, and further wherein cessation of water flow to the shower at the predetermined minimum temperature causes the pipe to cool resulting in the opening of said switch means and the deenergization of the heater means.

References Cited

UNITED STATES PATENTS

| | | | |
|---|---|---|---|
| 2,514,647 | 7/1950 | Jolliffe | 219—219 |
| 2,564,836 | 8/1951 | Elsenheimer | 219—219 |
| 3,160,736 | 12/1964 | Catterson | 219—345 |
| 3,200,705 | 8/1965 | Voecker et al. | 219—219 |

JOSEPH V. TRUHE, Primary Examiner

P. W. GOWDEY, Assistant Examiner

U.S. Cl. X.R.

219—345